(12) United States Patent
Jin et al.

(10) Patent No.: US 7,645,828 B2
(45) Date of Patent: Jan. 12, 2010

(54) MONODISPERSE SILICA SPHERES CONTAINING POLYAMINE AND PROCESS FOR PRODUCING THE SAME

(75) Inventors: Ren-Hua Jin, Tokyo (JP); Jian-Jun Yuan, Tokyo (JP)

(73) Assignee: Kawamura Institute of Chemical Research, Sakura-shi (JP)

( * ) Notice: Subject to any disclaimer, the term of this patent is extended or adjusted under 35 U.S.C. 154(b) by 86 days.

(21) Appl. No.: 11/909,654

(22) PCT Filed: Mar. 29, 2006

(86) PCT No.: PCT/JP2006/306520

§ 371 (c)(1),
(2), (4) Date: Sep. 25, 2007

(87) PCT Pub. No.: WO2006/106760

PCT Pub. Date: Oct. 12, 2006

(65) Prior Publication Data

US 2009/0036591 A1 Feb. 5, 2009

(30) Foreign Application Priority Data

Apr. 1, 2005 (JP) .............................. 2005-106010

(51) Int. Cl.
*C08K 3/34* (2006.01)
*C08G 67/02* (2006.01)
(52) U.S. Cl. ...................... 524/493; 524/612
(58) Field of Classification Search ................. 524/493
See application file for complete search history.

(56) References Cited

U.S. PATENT DOCUMENTS

2007/0166472 A1  7/2007  Jin et al.
2007/0197708 A1  8/2007  Jin et al.

FOREIGN PATENT DOCUMENTS

| JP | 62-225244 A | 10/1987 |
|---|---|---|
| JP | 02-263707 A | 10/1990 |
| JP | 06-100313 A | 4/1994 |
| JP | 2005-336440 A | 12/2005 |
| JP | 2006-063097 A | 3/2006 |
| JP | 2006-213888 A | 8/2006 |
| JP | 3883556 B2 | 2/2007 |
| JP | 3978440 B2 | 9/2007 |
| JP | 3978443 B2 | 9/2007 |

OTHER PUBLICATIONS

Jin, Ren-Hua, J. Mater. Chem., 2004, 14, 320-327.*
Jin, Ren-Hua, Macromol. Chem. Phys., 2003, 204, 403-409.*
International Search Report of PCT/JP2006/306520, date of mailing Jun. 20, 2006.
A. van Blaaderen et al.; "Synthesis and Characterization of Colloidal Dispersions of Fluorescent, Monodisperse Silica Spheres"; American Chemical Society, vol. 8, pp. 2921-2931, Langumuir 1992. Cited in the Spec.
Jennifer N. Cha et al.; "Biomimetic synthesis of ordered silica structures mediated by block copolypeptides"; Lettes to Nature, vol. 403, pp. 289-292, Jan. 20, 2000. Cited in the Spec.
M. Sumper et al.; "Biomimetic Control of Size in the Polyamine-Directed Formation of Silica Nanospheres"; Angew. chem. Int. vol. 42, pp. 5192-5195, 2003. Cited in the Spec.
N. Kroger et al.; "Species-specific polyamines from diatoms control silica morphology"; PNAS, vol. 97, No. 26, pp. 14133-14138, Dec. 19, 2000. Cited in the Spec.
Ren-Hua Jin; "Water soluble star block poly(oxazoline) with porphyrin label: a unique emulsion and its shape direction"; Journal of Materials Chemistry, vol. 14, pp. 320-327, 2004. Cited in the Spec.
W. Stober et al.; "Controlled Growth of Monodisperse Silica Spheres in the Micron size Range", Journal of Colloid and Interface Science, vol. 26, pp. 62-69, 1968. Cited in the Spec.
Yuji Sasanuma, et al., "Resolution of intra-and intermolecular interactions of a polymer comprising a heteroelement," Research Results from the 14/15th Annual Chemical Research Grant for Fundamental Research, Subject No. 14550842, Mar. 2004

* cited by examiner

*Primary Examiner*—Ling-Siu Choi
*Assistant Examiner*—Hui Chin
(74) *Attorney, Agent, or Firm*—Westerman, Hattori, Daniels & Adrian, LLP

(57) ABSTRACT

Monodisperse silica spheres containing polyamine, which comprise a polymer (A) having a linear polyethyleneimine chain, a compound (B) having an acidic group, and silica (C).

21 Claims, 2 Drawing Sheets

MONODISPERSE SILICA SPHERES CONTAINING POLYAMINE AND PROCESS FOR PRODUCING THE SAME

TECHNICAL FIELD

The present invention relates to monodisperse silica spheres containing a polymer having a linear polyethyleneimine chain, a compound having an acidic group, and silica. More detailed, the present invention relates to monodisperse spheres in which the polymer is physically bonded to the compound having an acidic group, particularly a functional molecule with luminance or the like having an organic acid group, and the bonded product is complexed with silica, and a process for producing the same.

BACKGROUND ART

Silica spheres are used in an extremely wide range of applications, including from industrial uses such as in various additives or catalysts to products for everyday use. Furthermore, such silica spheres are being investigated from various aspects, for possible introduction of functional molecules or organic materials, or the like, in accordance with the characteristics that are required by various applications.

With regard to the application of complex spheres in which functional molecules or an organic material is introduced to silica spheres, selection of the functional molecule or organic material to be introduced, the amount introduced, and the monodispersity of the spheres are considered as very important factors. As the monodisperse silica spheres having functional molecules or an organic material introduced, for example, spheres in which silica spheres that are surface-treated with a silane coupling agent are combined with functional molecules, are disclosed (see, for example, Patent Document 1). However, the spheres obtained from Patent Document 1 have functional groups on the sphere surfaces, but the structural body itself of the spheres is composed of silica only, thus the spheres are not spheres to which an organic material is introduced.

Also, as the spheres having an organic material introduced, for example, spheres in which an organic compound having a plurality of amino groups has been incorporated into silica spheres have been proposed (see, for example, Patent Document 2). However, since the spheres obtained from the Patent Document 2 include only an organic compound having amino groups, and silica, it is difficult to incorporate other functional molecules into the spheres. Furthermore, the process for producing the spheres is complicated as will be described later, it is difficult to control the sphere diameter, and the spheres do not show sufficient monodispersity.

In addition, spherical bodies obtained by synthesizing a self-emulsifiable compound by introducing a nonionic chain to a fluorescent molecule residue, and introducing silica to the compound, have been proposed (see, for example, Non-Patent Document 1). However, the spherical bodies disclosed in Non-Patent Document 1 have silica present only on the surface. Also, since complexation including silica is formed by using an O/W type emulsion, the production process is complicated, and it is difficult to achieve control of the particle diameter or homogenization, resulting in deteriorated monodispersity. Furthermore, since the spherical bodies (spheres) are based on emulsion particles, it is not possible to take the spheres out and process them into a powder.

On the other hand, for the application of complex spheres, it is important that how spheres with good monodispersity is produced. A significant number of the conventional silica spheres, and particularly monodisperse silica spheres, are produced by Stober's method in which an alkoxy silane is reacted in a mixture of an alcohol, highly concentrated ammonia and water to obtain spherical spheres (see, for example, Patent *Document* 2). Also for the method for obtaining silica spheres having functional molecules or organic materials introduced, improved versions of this Stober's method are being used. For example, a method of synthesizing a compound in which functional molecule residues are bonded to an alkoxy silane derivative, mixing this compound with a tetraalkoxy silane, and reacting the mixture in the same manner as in Stober's method; a method of synthesizing silica spheres by Stober's method, treating the sphere surface with a silane coupling agent, and further reacting the coupling agent with functional molecules (see Non-Patent Document 3); a method of introducing highly branched polyethyleneimine into silica by adding a small amount of highly branched polyethyleneimine to the highly concentrated ammonia medium in the Stober's method (see Patent Document 2), and the like are disclosed. However, in these improved versions of Stober's method, it is possible to incorporate functional molecules into the silica spheres, but the production processes are complicated, occasionally with low productivities. Furthermore, not all of these methods involve simultaneous introduction of functional molecules and organic materials. Moreover, these methods take long reaction times, or are associated with high environmental stress, such as a reaction condition of a high ammonia concentration being required, or the like.

In recent years, research on the synthesis of silica originating from biosilica has been conducted, and examination has been carried out on the synthesis of spherical silica in aqueous media under mild conditions using polyamines as templates. For example, examination has been carried out on synthesizing spherical silica in aqueous media using polypeptides or polypropyleneimines that are extracted from biosilica from a biological system, synthetic polyarylamine, block copolymers of polyamino acids, or the like (see, for example, Non-Patent Documents 4 to 6). However, in these methods, it is difficult to obtain uniformed spherical particles, and networks of bonded spheres are prevalently generated. Even in the case of obtaining individual spheres, they are obtained as mixtures of spheres of inhomogeneous size having no discrete particle diameters.

Patent Document 1: Japanese Unexamined Patent Application Publication No. 6-100313
Patent Document 2: Japanese Unexamined Patent Application Publication No. 2-263707
Non-Patent Document 1: R. H. Jin, Chem. Commun. (2002), p. 198; R. H. Jin, J. Mater. Chem., Vol. 14, p. 320 (2004)
Non-Patent Document 2: W. Stober et al., J. Colloid & Interface Sci., vol. 26, p. 62 (1968)
Non-Patent Document 3: A. Blaaderen et al., Langmuir, Vol. 8, p. 2921 (1992)
Non-Patent Document 4: N. Kroger et al., Proc. Natl. Acad. Sci. USA, Vol. 97, p. 14133 (2000)
Non-Patent Document 5: M. Sumper, Angew. Chem. Int. Ed., Vol. 42, p. 5192 (2003)
Non-Patent Document 6: Morse et al., Nature, Vol. 403, p. 289-292 (2000)

DISCLOSURE OF THE INVENTION

Problems to be Solved by the Invention

An object of the present invention is to provide monodisperse silica spheres having highly excellent monodispersity, which contain an organic material and a compound having an acidic group, to which compound various functional groups can be introduced, and to provide a process for producing the monodisperse spheres conveniently within a short time.

Means for Solving the Problems

The inventors of the present invention conducted intensive research to address the object described above, and found that when a compound (B) having an acidic group is added to a polymer (A) having a linear polyethyleneimine chain, aggregates are easily obtained, and that monodisperse spheres are obtained by a sol-gel reaction using an alkoxy silane, wherein the aggregates being used as the reaction field. Thus, the inventors completed the present invention.

Thus, a first aspect of the present invention is to provide monodisperse silica spheres containing polyamine, wherein the spheres containing a polymer (A) having a linear polyethyleneimine chain, a compound (B) having an acidic group, and silica (C).

Furthermore, a second embodiment of the present invention is to provide a process for producing monodisperse silica spheres containing polyamine, the process comprising:

(i) dissolving a polymer (A) having a linear polyethyleneimine chain and a compound (B) having an acidic group in a mixed solvent of water and a water-soluble organic solvent, to obtain aggregates consisted of the polymer (A) having a linear polyethyleneimine chain and the compound (B) having an acidic group; and (ii) performing a sol-gel reaction of an alkoxy silane on the aggregates as template, in the presence of water.

EFFECTS OF THE INVENTION

The monodisperse silica spheres which contains polyamine obtained by the present invention contain polyamine, that is, a polymer having a linear polyethyleneimine chain, and silica. Therefore, unlike conventional silica spheres, the spheres of the present invention can have a variety of chemical or physical functions that are possessed by polyethyleneimine. For example, since polyethyleneimine is a strong ligand, metal ions can be concentrated within silica. Also, since polyethyleneimine can reduce noble metal ions to metal atoms, nanoparticles of noble metals can be conveniently immobilized within the silica. Since polyethyleneimine also has properties such as a sterilizing function, resistant to viruses, and the like, the spheres can also exhibit such properties. Therefore, the monodisperse silica spheres of the present invention can be applied to various areas such as carriers for metal ions and/or nanometals, catalysts, antibacterial agent, disinfectants, antiviral agents, cosmetic products, and the like.

Furthermore, since the monodisperse silica spheres of the present invention are characterized in that various functional molecules, for example, fluorescent molecules, physiologically active molecules and the like can be easily introduced to the compound having an acidic group or the polymer having a linear polyethyleneimine chain, which is contained in the spheres, such functions can also be conferred to the resulting monodisperse spheres. Also from the fact that the monodisperse silica spheres of the present invention have highly excellent monodispersity, the properties stemming from these functional molecules, or the properties associated with monodispersity can be efficiently manifested. For example, application thereof to numerous fields such as materials for microlaser emission, materials for imaging, cancer diagnostic and/or therapeutic agents, photonic crystal materials, hole-burning recording materials, materials for solar cells, and the like, can be anticipated.

Moreover, in the process for production of the present invention, highly functional monodisperse silica spheres having excellent monodispersity can be produced on a time scale of several minutes to twenty minutes, by using a reaction process simulating silica synthesis in biological systems, under mild reaction conditions such as room temperature, neutral pH and the like. This process for production results in less environmental stress and a convenient production process, while allowing design of structures in accordance with various applications.

BEST MODE FOR CARRYING OUT THE INVENTION

Figure 1:
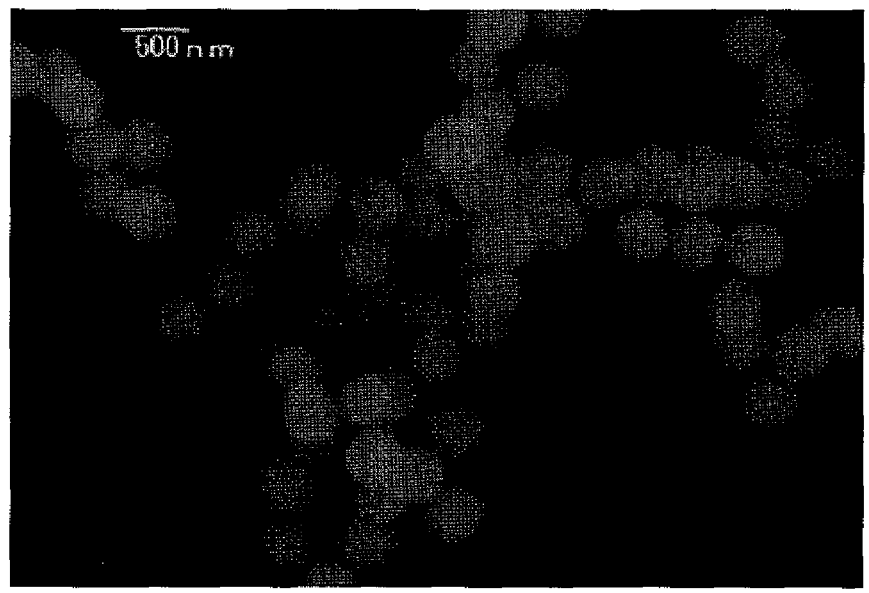
FIG. 1 is a scanning electron micrograph of the monodisperse silica spheres according to Example 1 of the present invention.

In order to produce silica (silicon oxide) in a desired shape from an aqueous sol-gel reaction, three critical conditions are considered to be indispensable. They are (1) a template for inducing the shape, (2) a scaffold for concentrating the silica source, and (3) a catalyst for polymerizing the silica source.

The present invention is characterized in that a polymer (A) having a linear polyethyleneimine chain is used as the organic material satisfying the above-described three factors. The linear polyethyleneimine chain is a rigid polymer chain having a secondary amine only in the main chain. The linear polyethyleneimine is soluble in hot water, but crystallizes at room temperature, thus existing as crystalline aggregates. Moreover, these crystals are dissolved in limited organic solvents only. This property is totally different to that of highly branched polyethyleneimine having primary, secondary and tertiary amines, which has not crystalline property and completely dissolving in water and common organic solvents.

The polymer (A) having a linear polyethyleneimine chain, that is, the polymer (A) having a backbone of linear polyethyleneimine, is dissolved in a water-soluble organic solvent, and for example, it is dissolved even at room temperature in methanol. In other words, the polymer becomes insoluble in water because a plurality of molecules aggregate and attain crystallinity, but exist as free molecules in methanol, thus forming a solution. It is conceived that the difference between these two media results in quasi-stable aggregates, in which the polymer is neither in the form of free molecules, nor in a crystalline form, in a mixed solvent of water with methanol or the like.

These quasi-stable aggregates can be physically crosslinked by the compound (B) having an acidic group used in the present invention, thus to form more stable aggregates. That is, hydrogen bonding occurs between the acidic group in the compound (B) having an acidic group and the ethyleneimine structure, and it becomes difficult for the compound (B) to exist in the mixed solvent of water and methanol or the like. Thus, the compound (B) is incorporated into the aggregates to be stabilized, and at the same time, the aggregates are also stabilized in the mixed solvent. Particularly in the case of using a polyfunctional acidic compound (b1) that will be described later, it is possible to intra-molecularly or inter-molecularly crosslink (hydrogen bonding) a plurality of polyethyleneimine chains that are contained in the polymer (A), and thus the polymer (A) can form more stable aggregates. Furthermore, in the case of using a monofunctional acidic compound (b2) having a hydrophobic chain, hydrophobic bonding takes place between the molecules of the compound (b2), and the molecules function like those of an acidic compound having a functionality of two or more, thus effecting crosslinking between a plurality of polyethyleneimine chains, and inducing the polymer (A) to form stable aggregates. Therefore, it is believed that the aggregates in a mixed solvent are stabilized such that a large amount of the compound (B) having an acidic group is present in the cores of the aggregates, while polyethyleneimine chains are surrounding the cores.

According to the present invention, spheres in which the polymer (A) and silane are combined are obtained by performing a sol-gel reaction of an alkoxy silane in a mixed solvent (in the presence of water) under the catalytic effect of the ethylene imine structure in the polymer (A), using the stable aggregates obtained from the above as a template.

The spheres obtained as described above have an almost uniform particle diameter which can be determined by the structure and the like of the polymer (A) and the compound (B) having an acidic group, and monodisperse silica spheres are achieved.

[Polymer (A) Having Linear Polyethyleneimine Chain]

The linear polyethyleneimine chain as used in the present invention refers to a straight-chained polymer skeleton containing an ethyleneimine unit of a secondary amine as the main constituent unit. In this skeleton, constituent units other than the ethyleneimine unit may be present. However, in order to form aggregates formed by hydrogen bonding (hereinafter, simply referred to as aggregates) with a small amount of the compound (B) having an acidic group that will be described later, in a mixed solvent of water and a water-soluble organic solvent, it is preferable that a predetermined chain length of the polymer (A) consists of consecutive ethyleneimine units. The length of the linear polyethyleneimine chain is not particularly limited as long as the length is in the range capable of aggregating the polymer having the skeleton. In order to form aggregates appropriately, the number of a repeating unit of the ethyleneimine unit included in the skeleton part is preferably in the range of 10 to 10,000, and particularly preferably in the range of 20 to 8,000.

The polymer (A) used for the present invention may be favorably a polymer having the linear polyethyleneimine chain within the structure, and the shape may be linear, star-shaped or comb-shaped, as long as the polymer can produce aggregates in the presence of water.

The linear, star-shaped or comb-shaped polymer may be linear polyethyleneimine chains only, or may be block copolymers including blocks of linear polyethyleneimine chains (hereinafter, simply referred to as polyethyleneimine block) and blocks of other polymers. Examples of the blocks of other polymers include blocks of water-soluble polymers such as polyethylene glycol, polypropionylethyleneimine, polyacrylamide and the like, and blocks of hydrophobic polymers such as polystyrene, polyoxazolines such as polyphenyloxazoline, polyoctyloxazoline and polydodecyloxazoline, polyacrylates such as polymethylmethacrylate and polybutylmethacrylate, and the like. By forming block copolymers with these other polymer blocks, the shape or characteristics of the aggregates can be adjusted.

The proportion of the linear polyethyleneimine chain in the polymer (A) in the case where the polymer (A) having a linear polyethyleneimine chain has other polymer blocks, is not particularly limited as long as the proportion is in the range capable of forming aggregates. To form aggregates appropriately, the proportion of the linear polyethyleneimine chain in the polymer is preferably 25% by mole or greater, more preferably 40% by mole or greater, and even more preferably 50% by mole or greater.

The polymer (A) having a linear polyethyleneimine chain can be easily obtained by hydrolyzing a polymer having a straight-chained skeleton, wherein the polymer is a precursor of the polymer (A) (hereinafter, simply referred to as precursor polymer) and the skeleton is any of polyoxazolines, in the acidic conditions or in the alkaline conditions. Therefore, the linear, star-shaped or comb-shaped shape of the polymer having a linear polyethyleneimine chain can be easily designed by controlling the shape of the precursor polymer. Furthermore, the degree of polymerization and the terminal structure can be easily adjusted by controlling the degree of polymerization and terminal functional group of the precursor polymer. Moreover, in the case of forming a block copolymer having a linear polyethyleneimine chain, the polymer (A) can be obtained by providing a block copolymer as the precursor polymer, and selectively hydrolyzing the linear skeleton comprising a polyoxazoline species in the precursor.

The precursor polymer can be synthesized by a synthesis method such as a cationic polymerization method and a macromonomer method, using the monomer of oxazolines, and by appropriately selecting the synthesis method or polymerization initiator, precursor polymers having various shapes such as linear, star-shaped or comb-shaped shapes can be synthesized.

Examples of the monomer used for forming a straight-chained skeleton, which is any of polyoxazolines, include oxazoline monomers such as methyloxazoline, ethyloxazoline, methylvinyloxazoline, phenyloxazoline and the like.

Examples of the polymerization initiator which is used in the present invention include compounds having a functional group(s) such as an alkyl chloride group, an alkyl bromide group, an alkyl iodide group, a toluenesulfonyloxy group, a trifluoromethylsulfonyloxy group or the like in the molecule. These polymerization initiators can be obtained by converting the hydroxyl group of numerous alcohol compounds to another functional group. Among these, the products having a functional group resulting from bromination, iodation, toluenesulfonation, and trifluoromethylsulfonation as the functional group conversion are preferred because they exhibit high polymerization initiation efficiencies, and particularly the products having an alkyl bromide group or an alkyl toluenesulfonate group are preferred as the initiator.

The products obtained by converting the terminal hydroxyl group of poly(ethylene glycol) to bromine or iodine, or to a toluenesulfonyl group can be used as the polymerization initiators. In that case, the degree of polymerization of poly(ethylene glycol) is preferably in the range of 5 to 100, and particularly preferably in the range of 10 to 50.

Furthermore, it is also possible to confer special functions to the resulting monodisperse silica spheres by introducing dyes or the like having any skeleton among a porphyrin skeleton, phthalocyanine skeleton or pyrene skeleton, which has a light-induced emitting function, an energy transfer function and/or an electron transfer function, and also having functional groups having the ability to initiate cationic ring-opening polymerization.

The linear precursor polymer can be obtained by polymerizing the aforementioned oxazoline monomer by using a polymerization initiator having a monovalent or divalent functional group. Examples of the polymerization initiator include monovalent compounds such as exemplified by methylbenzene chloride, methylbenzene bromide, methylbenzene iodide, methylbenzene toluenesulfonate, methylbenzene trifluoromethylsulfonate, methane bromide, methane iodide, methane toluenesulfonate, or toluenesulfonic anhydride, trifluoromethylsulfonic anhydride, 5-)4-bromomethylphenyl)-10,15,20-tri(phenyl)porphyrin, bromomethylpyrene and the like, divalent compounds such as dibromomethylbenzene, diiodomethylbenzene, dibromomethylbiphenylene, dibromomethylazobenzene, or the like. Linear polyoxazolines that are industrially used, such as poly(methyloxazoline), poly(ethyloxazoline) and poly(methylvinyloxazoline), can be used directly as the precursor polymer.

The star-shaped precursor polymer can be obtained by polymerizing the aforementioned oxazoline monomer using a polymerization initiator having a functional group with a valency of 3 or higher. Examples of the polymerization initiator having a valency of 3 or higher include trivalent compounds such as tribromomethylbenzene and the like; tetravalent compounds such as tetrabromomethylbenzene, tetra(4-chloromethylphenyl)porphyrin, tetrabromoethoxyphthalocyanine and the like; and compounds having a valency of 5 or greater, such as hexabromomethylbenzene, tetra(3,5-ditosylylethyloxyphenyl)porphyrin and the like.

In order to obtain the comb-shaped precursor polymer, the polymer can be synthesized by a method of polymerizing an oxazoline monomer wherein the polymerization is started from a polyvalent polymerization initiating group of a linear polymer having a polyvalent polymerization initiating group. For example, the polymer can be obtained by halogenating the hydroxyl group of a polymer which has a hydroxyl group at the side position thereof, such as epoxy resin or polyvinyl alcohol, with bromine, iodine or the like, or by converting the hydroxyl group to a toluenesulfonyl group, and then using the converted moiety as the polymerization initiator.

As a method of obtaining a comb-shaped precursor polymer, a polyamine type polymerization chain stopper may be used. For example, the comb-shaped polyoxazoline can be obtained by polymerizing oxazoline using a monovalent polymerization initiator, and coupling the terminals of the polyoxazoline to an amino group of polyethyleneimine, polyvinylamine, polypropylamine and the like.

Hydrolysis of the straight-chained skeleton part which consists of any of polyoxazolines in the precursor polymer obtained as described above may be performed under any conditions, such as under acidic conditions or under alkaline conditions.

Hydrolysis under acidic conditions may be exemplified by a method of stirring the precursor polymer under heating in an aqueous solution of hydrochloric acid, and then a hydrochloride salt of the polymer having a linear polyethyleneimine chain can be obtained. When the obtained hydrochloride salt is treated with an alkaline aqueous solution, for example, with an excess of aqueous ammonia, a crystal powder of the polymer having a basic polyethyleneimine chain can be obtained. Examples of the aqueous solution of hydrochloride include any solutions such as from an aqueous solution of about 1 mol/L to concentrated hydrochloric acid. In order to efficiently perform hydrolysis, it is preferable to use a 5 mol/L aqueous solution of hydrochloric acid. Also the reaction temperature is preferably from 70 to 90° C.

Hydrolysis under alkaline conditions may be exemplified by a method of using an aqueous solution of sodium hydroxide, and thereby the polyoxazoline chain can be converted to a polyethyleneimine chain. After reacting under alkaline conditions, the reaction liquid is washed using a dialysis membrane to remove excess sodium hydroxide, and a crystal powder of the polymer having a linear polyethyleneimine chain can be obtained. The concentration of sodium hydroxide used may be in the range of 1 to 10 mol/L, and to perform a more efficient reaction, the concentration is preferably in the range of 3 to 5 mol/L. The reaction temperature is preferably from 70 to 90° C.

In the hydrolysis under acidic conditions or under alkaline conditions, the amount of acid or alkali used may be from 1 to 10 equivalents relative to the oxazoline unit in the precursor polymer, and the amount is preferably from 2 to 4 equivalents from the viewpoints of improving the reaction efficiency and simplifying the post-treatment.

The hydrolysis process described above results in conversion of the straight-chained skeleton which consists of any of polyoxazolines of the precursor polymer to a linear polyethyleneimine chain, and thus a polymer having the polyethyleneimine skeleton can be obtained.

Furthermore, in the case of forming a block copolymer of a linear polyethyleneimine block and another polymer block, such a copolymer can be obtained by preparing a straight-chained polymer block which is any of polyoxazolines as the precursor polymer and another polymer block, and selectively hydrolyzing the straight-chained polymer block which is any of polyoxazolines to form the block copolymer.

When the other polymer block is a water-soluble polymer block such as poly(N-propionylethyleneimine) or the like, a block copolymer can be formed utilizing the fact that poly(N-propionylethyleneimine) has higher solubility to organic solvents compared to poly(N-formylethyleneimine) or poly(N-acetylethyleneimine). That is, 2-oxazoline or 2-methyl-2-oxazoline is subjected to cationic ring-opening living polymerization in the presence of the polymerization initiator described above, and then 2-ethyl-2-oxazoline is further polymerized to the resulting living polymer, thus to obtain a precursor polymer comprising a poly(N-formylethyleneimine) block or poly(N-acetylethyleneimine) block and a poly(N-propionylethyleneimine) block. This precursor polymer is dissolved in water, and this aqueous solution is mixed with an organic solvent which is incompatible with water that dissolves the poly(N-propionylethyleneimine) block with stirring, thus to form an emulsion. An acid or alkali is added to the aqueous phase of the emulsion, and the poly(N-formylethyleneimine) block or poly(N-acetylethyleneimine) block is preferentially hydrolyzed to form a block copolymer comprising a linear polyethyleneimine block and a poly(N-propionylethyleneimine) block When the valency of the polymerization initiator used herein is 1 or 2, a straight-chained block polymer is formed, while with a higher valency than 2, a star-shaped block copolymer is obtained. It is also possible to obtain a polymer having a multi-block structure by selecting the precursor polymer which is a multi-block block copolymer.

[Compound (B) Having Acidic Group]

The compound (B) having an acidic group that is used for the present invention may be a compound which can constitute a physically crosslinked structure (hydrogen bonding) with the polymer (A) having a linear polyethyleneimine chain in a mixed solvent of water and a water-soluble organic solvent, to form aggregates of the polymer (A) having a linear polyethyleneimine chain and the compound (B) having an acidic group. This physical crosslinking allows inhibition of the tendency for high crystallization of the linear polyethyleneimine chain, as well as prevention of detachment of the polymer (A) having a linear polyethyleneimine chain in the solvent as a free molecule, thus forming quasi-stable aggregates in the solvent.

As the compound (B) having an acidic group used for the present invention, a polyfunctional acidic compound (b1) having a functionality of 2 or greater can be suitably used. As the polyfunctional acidic compound (b1), any acidic compound among organic polyfunctional acidic compounds and inorganic polyfunctional acidic compounds may be used. Examples thereof include carboxylic acid compounds having a functionality of 2 or greater, polysulfonic acid compounds having a functionality of 2 or greater, polyphosphoric acid compounds having a functionality of 2 or greater, and the like.

Specific examples thereof include aliphatic acids such as tartaric acid, antimonyl tartaric acid, maleic acid, cyclohexanetricarboxylic acid, cyclohexanehexacarboxylic acid, adamantanedicarboxylic acid, adipic acid, azelaic acid, sebacic acid, undecanedioic acid, di(ethylene glycol) bis(carboxymethyl) ether, tri(ethylene glycol) bis(carboxymethyl) ether and the like; aromatic or aliphatic sulfonic acids such as terephthalic acid, biphenyldicarboxylic acid, oxybisbenzoic acid, PIPES and the like; dyes such as acid yellow, acid blue, acid red, direct blue, direct yellow and direct red dyes; polymeric acids such as poly(acrylic acid), poly(methacrylic acid), poly(styrene sulfonic acid) and the like; acidified RNA and DNA oligomers; and the like.

In the case of inorganic acids, an acidic compound having a valency of 2 or greater may be suitably used. For example, sulfuric acid, phosphoric acid, boric acid, disulfuric acid, diphosphoric acid, polyphosphoric acid and the like may be mentioned.

If the compound (B) having an acidic group is a monofunctional acidic compound, it is preferable that the compound be a monofunctional acidic compound (b2) having a hydrophobic chain which is capable of hydrophobic bonding with other chains. In that case, the acidic group is bound to the nitrogen atom of polyethyleneimine by hydrogen bonding, but hydrophobic chains can assemble by hydrophobic bonding between the chains. As a result, physical crosslinking between polyethyleneimine chains is achieved intra-molecularly or between multiple molecules, thus obtaining aggregates.

Specific examples of the monofunctional acidic compound (b2) include acidic surfactants and the like. Examples thereof include long-chain alkylsulfonic acids, long-chain alkylcarboxylic acids and long-chain alkylphosphoric acids. The alkyl chains thereof preferably have 6 to 22 carbon atoms.

As the compound (B) having an acidic group used for the present invention, those having various functionalities can be appropriately selected and used, and any optional functional molecules can be introduced to the resulting monodisperse silica spheres. As the functional molecule used as the compound (B), it is particularly preferable to use fluorescent compounds, and in the case of using the fluorescent compounds, the resulting monodisperse silica spheres also have fluorescence property, and thus it becomes possible to use the microspheres suitably in a variety of applications.

Examples of the fluorescent compound include compounds having strong luminance property, such as tetraphenylporphyrin tetracarboxylic acid, pyrenedicarboxylic acid, pyrenedisulfonic acid, pyrenetetrasulfonic acid, tetraphenylporphyrin tetrasulfonic acid, tetraphyenylporphyrin tetraphosphonic acid, phthalocyanine tetrasulfonic acid, and the like.

The proportion of the compound (B) having an acidic group to be used may be in the range where it is possible to obtain stable aggregates, and it is preferable that the ratio of the ethyleneimine units in the polymer (A) having a linear polyethyleneimine chain and the acidic group in the compound (B) having an acidic group be, as a molar ratio represented by ethyleneimine unit/acidic group, in the range of from 10/1 to 5000/1, and it is more preferable that the ratio be from 100/1 to 2000/1. Also in the case of using a monofunctional acid compound, the molar ratio represented by ethyleneimine unit/acidic group may be favorably in the range of from 10/1 to 5000/1, and it is more suitable if the ratio is from 50/1 to 1000/1.

[Monodisperse Silica Spheres]

The monodisperse silica spheres of the present invention comprise a polymer (A) having a linear polyethyleneimine chain, a compound (B) having an acidic group, and silica (C).

The monodisperse silica spheres of the present invention can be controlled to have a particle diameter in the range of 10 to 1000 nm, and have extremely excellent monodispersity, so that it is possible to have a particle size distribution with a width of ±15% or less with respect to the average particle size. The particle size thereof can be adjusted by the conditions of the preparation of aggregates (for example, type, form and length of polymer of the polymer (A) having a linear polyethyleneimine chain used; number of acidic groups and type of the compound (B) having an acidic group; type of the water-soluble organic solvent, or mixing ratio thereof with water, and the like], or of the sol-gel reaction of silica.

The content of silica in the monodisperse silica spheres of the present invention varies within a certain range depending on the reaction conditions or the like, and thus is adjustable. The content of silica can be set to the range of 50 to 90% by mass, and preferably 70 to 90% by mass based on the total mass of the monodisperse silica spheres. The content of silica can be varied by altering the amount of polyethyleneimine in the polymer (A) used during the sol-gel reaction.

The monodisperse silica spheres of the present invention contain the polymer (A) having a linear polyethyleneimine chain in the spheres. Since the linear polyethyleneimine chain has a positive charge in an aqueous medium, the surface of the monodisperse silica spheres of the present invention can essentially have a positive charge atmosphere. Because of this, the monodisperse silica spheres of the present invention exhibit excellent monodispersity, and also, even if the spheres are dried and agglomerated, they can be reconstituted to individual spheres when dispersed in an aqueous medium. Furthermore, when stored in an aqueous medium, the spheres may sometimes settle down over time, but even in this case, the spheres return to their state as individual spheres upon re-stirring, and are dispersed. This is a characteristic significantly distinctive from the nature of conventional silica sphere dispersions which, once dried, cannot be redispersed as individual spheres. In the case of the silica spheres that are obtained by conventional Stober method or the like, the spheres do not have redispersibility in solvent media, unless the surface of the resulting spheres is chemically modified with a substance such as a surfactant. Also, since the spheres undergo secondary agglomeration upon drying, pulverization treatment or the like may often be necessary to obtain fine powders.

The monodisperse silica spheres of the present invention can also adsorb metal ions at high concentrations, due to the ethyleneimine unit of the polymer (A) having a linear polyethyleneimine chain that is present inside the silica microparticles. Furthermore, since this ethyleneimine unit can be readily converted to a cation, the monodisperse silica spheres of the present invention are capable of adsorbing or fixing various ionic substances, such as anionic biomaterials and the like. In addition, the polymer (A) having a linear polyethyleneimine chain can easily form block or graft copolymers with other polymers, and the structural control of the polymer side chain or terminal end structure is also feasible. Thus, it is possible to impart various properties to the monodisperse spheres by forming block copolymers of the polymer (A) with various functional polymers, or by controlling the terminal structure.

As the property to be imparted, for example, fixation of a fluorescent material, or the like may be mentioned. For example, when a star-shaped polyethyleneimine wherein porphyrin is used at the center is used, the porphyrin residue can be incorporated into the monodisperse silica spheres. Also, by introducing a small amount of fluorescent substance or a polymer having fixed thereon a small amount of pyrene, porphyrin or the like, onto the linear polyethyleneimine chain, the functional residues can be incorporated into the monodisperse spheres. In addition, by using a product prepared by mixing a small amount of a fluorescent dye such as porphyrin, phthalocyanine, pyrene or the like, which has an acidic acid such as, for example, a carboxylic acid group or a sulfonic acid group, with the linear polyethyleneimine chain which has a base, it is possible to obtain the monodisperse spheres wherein such fluorescent substances is incorporated.

[Process for Producing Monodisperse Silica Spheres]

The process for producing the monodisperse silica spheres of the present invention is a process comprising: (1) dissolving a polymer (A) having a linear polyethyleneimine chain and a compound (B) having an acidic group in a mixed solvent of water and a water-soluble organic solvent, to obtain aggregates of the polymer (A) having a linear polyethyelneimine chain and the compound (B) having an acidic group; and (2) performing a sol-gel reaction using an alkoxy silane and using the aggregates as the reaction field in the presence of water.

According to the process of production of the present invention, first, a polymer (A) having a linear polyethyleneimine chain and a compound (B) having an acidic group) are dissolved in a mixed solvent of water and a water-soluble organic solvent. It is conceived that this leads to the formation of stable aggregates, as the quasi-stable aggregates, which are formed by the polymer (A) having a linear polyethyleneimine chain in the mixed solvent of water and a water-soluble organic solvent, are physically crosslinked (hydrogen bonding) by the compound (B) having an acidic group.

When appropriately forming the aggregates, in the case of forming aggregates using a polyfunctional acidic compound (b1) as the compound (B) having an acidic group, it is preferable that the ratio between the ethyleneimine unit in the polymer having a linear polyethyleneimine chain and the acidic group of the polyfunctional acidic compound be, as the molar ratio represented by ethyleneimine unit/acidic group, preferably in the range of from 10/1 to 5000/1, and it is more preferable that the ratio be from 100/1 to 2000/1. Also in the case of using a monofunctional acid compound, the molar ratio represented by an ethyleneimine unit/acidic group may be favorably in the range of from 10/1 to 5000/1, and it is more suitable if the ratio is from 50/1 to 1000/1.

When forming the aggregates, the water-soluble organic solvent used in the mixed solvent of water and a water-soluble organic solvent may be favorably a homogeneous solvent in which the volume ratio of water/water-soluble organic solvent is from 9/1 to 1/9. Examples thereof include water-soluble organic solvents such as methanol, ethanol, acetonitrile, dimethylformamide, dimethylacetamide, dimethylsulfoxide, dioxirane, pyrrolidone and the like may be mentioned. The organic solvents can be used individually or as mixtures thereof.

With regard to the volume ratio represented by water/water-soluble organic solvent in the mixed solvent, a mixed solvent prepared in the range of from 30/70 to 60/40 can be preferably used.

The preparation of the aggregates of the polymer (A) having a straight polyethyleneimine chain and the compound (B) having an acidic group in a mixed solvent can be carried out by dissolving the polymer (A) and the acidic group-containing compound (B) in an organic solvent, and mixing the solution with water. Furthermore, the aggregates can also be prepared by adding the polymer (A) into a mixed solvent, further adding the compound (B) having an acidic group, heating the mixture to 90° C. or below, and returning the mixture to room temperature.

The concentration of the polymer (A) having a linear polyethyleneimine chain in the mixed solvent can be favorably set insofar as fusion between the aggregates does not occur. A suitable concentration range is from 0.05 to 15% (% by mass), and a preferred concentration range is from 0.5 to 5% by mass.

The formation of aggregates according to the present invention by means of physical crosslinking between polyethyleneimine and acid in an aqueous medium is convenient from a process-wise point of view. However, it is possible to convert the physical crosslinking to covalent crosslinking, and aggregate-like products can also be obtained. For example, ester crosslinking agents, acid anhydrides acid chlorides, epoxy crosslinking agents and aldehyde crosslinking agents, which have a functional group having a functionality of 2 or greater and can react with the amino group of polyethyleneimine at room temperature, can be used. Examples of the aldehyde crosslinking agent include malonylaldehyde, succinylaldehyde, glutaraldehyde, adipoylaldehyde, phthaloylaldehyde, isophthaloylaldehyde, terephthaloylaldehyde and the like. Examples of the epoxy crosslinking agent include polyethylene glycol diglycidyl ether, bisphenol A diglycidyl ether, glycidyl chloride, glycidyl bromide and the like. Examples of the acid chloride include malonyl chloride, succinyl chloride, glutaryl chloride, adipoyl chloride, phthaloyl chloride, isophthaloyl chloride, terephthaloyl chloride, and the like. Also, examples of the acid anhydride include phthalic anhydride, succinic anhydride, glutaric anhydride and the like. Furthermore, as the ester crosslinking agent, methyl malonate, methyl succinate, methyl glutarate, methyl phthaloate, methyl polyethylene glycol carboxylate, and the like may be mentioned.

The process for producing the monodisperse silica spheres of the present invention comprises, subsequent to the step of (1), the above-described step of (2) in which a sol-gel reaction is performed in the presence of water using the aggregates as the reaction field and using an alkoxy silane.

Examples of the method of performing the sol-gel reaction between the aggregates and the alkoxy silane include a method of performing the sol-gel reaction at the room temperature subsequent to directly adding the alkoxy silane, or adding a solution formed by dissolving the alkoxy silane in a solvent which can be used for conventional sol-gel reactions, to the aqueous medium containing the aggregates. Monodisperse silica spheres can be easily obtained by the method.

The alkoxy silane may be exemplified by tetraalkoxy silanes, alkyltrialkoxy silanes or the like.

Examples of the tetraalkoxysilane include tetramethoxysilane, tetraethoxysilane, tetrapropoxysilane, tetrabutoxysilane, tetra-t-butoxysilane and the like.

Examples of the alkyltrialkoxysilane include methyltrimethoxysilane, methyltriethoxysilane, ethyltrimethoxysilane, ethyltriethoxysilane, n-propyltrimethoxysilane, n-propyltriethoxysilane, iso-propyltrimethoxysilane, iso-propyltriethoxysilane, 3-chloropropyltrimethoxysilane, 3-chloropropyltriethoxysilane, vinyltrimethoxysilane, vinyltriethoxysilane, 3-glycidoxypropyltrimethoxysilane, 3-glycidoxypropyltriethoxysilane, 3-aminopropyltrimethoxysilane, 3-aminopropyltriethoxysilane, 3-mercaptopropyltrimethoxysilane, 3-mercaptotriethoxysilane, 3,3,3-trifluoropropyltrimethoxysilane, 3,3,3-trifluoropropyltriethoxysilane, 3-methacryloxypropyltrimethoxysilane, 3-methacryloxypropyltriethoxysilane, phenyltrimethoxysilane, phenyltriethoxysilane, p-chloromethylphenyltrimethoxysilane, p-chloromethylphenyltriethoxysilane, dimethyldimethoxysilane, dimethyldiethoxysilane, diethyldimethoxysilane, diethyldiethoxysilane, or the like.

The sol-gel reaction which proves monodisperse silica spheres proceeds in an aqueous medium such as a mixed solution of water and a water-soluble organic solvent, in the presence of aggregates. The reaction does not take place in the continuous phase of the aqueous medium but occurs in the aggregate domains. Therefore, under the conditions for a complexation reaction, in so far as the aggregates are not to be dissolved, the reaction conditions are arbitrary.

In the sol-gel reaction, when an excess amount of the alkoxy silane, which is the silica source, is used with respect to the ethyleneimine unit in the polymer (A) having a linear polyethyleneimine chain, spheres of organic-inorganic complex type can be suitably formed. The extent of excess is preferably in the range of 2 to 1000 times equivalents with respect to ethyleneimine.

The time for the sol-gel reaction may be arbitrarily selected from a wide range of from 1 minute to several days, but in the case of using methoxysilanes which are highly reactive with alkoxy silane, the reaction time may be from 1 minute to 24 hours. From the viewpoint of increasing the reaction efficiency, it is appropriate to set the reaction time to 30 minutes to 5 hours. Also, in the case of using ethoxysilanes or butoxysilanes, which has both low reactivity, it is preferable that the sol-gel reaction time be 5 hours or longer, and it is also preferable to take as long as one week.

Upon producing monodisperse silica spheres, the diameter (average particle size) of the monodisperse silica spheres can be adjusted by adjusting the geometrical form of the polymer structure, the degree of polymerization, composition and the non-ethyleneimine portion that can be introduced into the primary structure of the polymer, the structure of the compound having an acidic group, the conditions for formation of monodisperse spheres, and the like.

For example, monodisperse silica spheres having a diameter of 150 nm can be obtained by using a star-shaped polyethyleneimine which is a star-shaped polymer having 6 linear polyethyleneimine chains on a benzene ring, with the average degree of polymerization for each arm being 100, and using tetra(p-sulfonylphenyl)porphyrin as the compound having an acidic group, and adding tetramethoxysilane to the aggregates obtained by combining the aforementioned two compounds in methanol/water. When a star-shaped polymer having an average degree of polymerization of 50 for the polyethyleneimine is used in the same method, monodisperse silica spheres having a diameter of 800 nm can be obtained. That is, by using a star-shaped polymer of varying degree of polymerization, the diameter of the resulting monodisperse silica spheres can be significantly changed.

According to the production process of the present invention, monodisperse silica spheres which do not agglomerate and have a uniform sphere size can be obtained. The sphere size distribution of the resulting monodisperse silica spheres may vary with the conditions for production and the target sphere size, but silica spheres having a particle size distribution which is included in the range of ±15% or less, or under preferable conditions, ±10% or less, with respect to the target particle size (average sphere size) can be produced by the present invention.

As discussed above, the monodisperse silica spheres of the present invention are capable of fixation or concentration of various materials due to the polymer (A) having a linear polyethyelneimine chain that is contained inside the spheres, in addition to the monodispersity of the spheres. As such, since the monodisperse silica spheres of the present invention are capable of fixation or concentration of metal or biomaterials within their nano-sized spheres, the spheres serve as a useful material for various fields such as the fields of electronic materials, biotechnology, environment-responsive products, and the like The process for producing monodisperse silica spheres containing polyamine of the present invention is very simple compared to the existing production processes such as Stober's method, which is widely used, and thus there is a significant expectation of the application of the process of the present invention, regardless of the type or field of industry. The monodisperse silica spheres constitute a material which is useful in the overall field for the application of silica materials, as well as in the field for the application of polyethyleneimine.

EXAMPLES

Hereinafter, the present invention will be more specifically described by way of Examples and Reference Examples, but the present invention is not intended to be limited thereto. Unless stated otherwise, the term "%" indicates "% by mass."

[Analysis of Sphere Shape by Scanning Electron Microscopy]

A sample isolated and dried was mounted on a glass slide, and this was observed with an apparatus for surface observation VE-7800 manufactured by Keyence Corporation.

[Analysis of Fluorescent Molecules in Spheres by Fluorescence Spectroscopy]

The silica spheres were dispersed in methanol, and their luminance was measured with a Hitachi F-4500 fluorescence meter.

Synthesis Example 1

Synthesis of Linear Polymer Having Linear Polyethyleneimine Chain (L-PEI)

5 g of a commercially available polyethyloxazoline (number average molecular weight: 500,000; average polymerization degree: 5,000; manufactured by Sigma-Aldrich Company) was dissolved in 20 mL of a 5 M aqueous solution of hydrochloric acid. The solution was heated to 90° C. in an oil bath, and was stirred for 10 hours at that temperature. 50 mL of acetone was added to the reaction liquid to completely precipitate the polymer (reaction product), and the polymer was filtered and washed three times with methanol to obtain a white powder of linear polyethyleneimine. The obtained powder was identified by $^1$H-NMR (heavy water), and it was confirmed that the peaks at 1.2 ppm ($CH_3$) and 2.3 ppm ($CH_2$), derived from the side chain ethyl group of polyethyloxazoline, had completely disappeared. That is, it appeared that polyethyloxazoline was completely hydrolyzed to be converted to polyethyleneimine.

The powder was dissolved in 5 mL of distilled water, and while stirring, 50 mL of 15% aqueous ammonia was added dropwise to the solution. The mixture was left to stand overnight, subsequently a powder precipitated therefrom was filtered, and the powder was washed 3 times with cold water. The powder after washing was dried at room temperature in a desiccator, to obtain a linear polymer having a linear polyethyleneimine chain (L-PEI). The yield was 4.2 g (including water of crystallization). The polyethyleneimine obtained by hydrolysis of polyoxazoline is such that only the side chains undergo a reaction, and there is no change in the main chain. Thus, the degree of polymerization of the obtained L-PEI was 5,000, which was the same as the degree of polymerization prior to hydrolysis.

Synthesis Example 2

Synthesis of Star-Shaped Polymer Having Linear Polyethyleneimine Chains Centered Around Benzene Ring (H-PEI)

According to the method described in Jin, J. Mater. Chem., 13, 672-675 (2003), a star-shaped polymethyloxazoline in which 6 polymethyloxazoline arms are bound to a benzene ring as the center, which is a precursor polymer, was synthesized as follows.

In a test tube which has a ground joint position and is equipped with a magnetic stirrer, 0.021 g (0.033 mmol) of hexakis(bromomethyl)benzene was introduced as a polymerization initiator, and the mouth of the test tube was stoppered with a three-way cock. Then, a vacuum was applied to the test tube, and then the test tube was purged with nitrogen. Under a nitrogen stream, 2.0 ml (24 mmol) of 2-methyl-2-oxazoline and 4.0 ml of N,N-dimethylacetamide were sequentially added using a syringe through the inlet of the three-way cock. The test tube was heated to 60° C. in an oil bath and maintained at the temperature for 30 minutes. The liquid mixture turned clear. This clear liquid mixture was further heated to 100° C., and was stirred at that temperature for 20 hours, thus to obtain a precursor polymer. From $^1$H-NMR measurement of this liquid mixture, the conversion rate of the monomer was 98%. The average degree of polymerization of the polymer was estimated from this conversion rate, and the average degree of polymerization for each arm was calculated to be 115. Furthermore, in the measurement of molecular weight by GPC, the mass average molecular weight of the polymer was 22,700, and the molecular weight distribution was 1.6.

A star-shaped polymer having linear polyethyleneimine chains, in which 6 polyethyleneimine chains are bound to a benzene ring core, was obtained by using the precursor polymer, and by hydrolyzing polymethyloxazoline in the same manner as in Synthesis Example 1 above. From the measurement of $^1$H-NMR (TMS external standard, in heavy water), it was found that the peak at 1.98 ppm derived from the side chain methyl of the precursor polymer prior to hydrolysis completely disappeared.

The resulting star-shaped polymer was subjected to reprecipitation in ammonia, washing with cold water, and conducting drying in the same manner as in Synthesis Example 1 above, to obtain a star-shaped polymer having linear polyethyleneimine chains (H-PEI), in which 6 straight polyethyleneimine chains are bound to a benzene ring core.

Synthesis Example 3

Synthesis of Star-Shaped Polymer Having Linear Polyethyleneimine Chains Centered Around Benzene Ring (T-PEI)

In a test tube which has a ground joint position and is equipped with a magnetic stirrer, tetrakis(bromomethyl)benzene (0.033 mol) was introduced as a polymerization initiator, and the mouth of the test tube was stoppered with a three-way cock. Then, a vacuum was applied to the test tube, and then nitrogen was introduced thereto to replace the atmosphere to a nitrogen atmosphere. Under a nitrogen stream, 2.0 ml (24 mmol) of 2-methyl-2-oxazoline and 4.0 ml of N,N-dimethylacetamide were sequentially added using a syringe through the inlet of the three-way cock. The mixture was heated to 100° C. in an oil bath, and was maintained at that temperature for 18 hours while stirring. After the stirring, the conversion rate of methyloxazoline was 100%. The average degree of polymerization of the polymer was estimated from this conversion rate, and the average degree of polymerization for each arm was calculated to be 180. Furthermore, in the measurement of molecular weight by GPC, the mass average molecular weight of the polymer was 18,500, and the molecular weight distribution was 1.43.

A star-shaped polymer having linear polyethyleneimine chains, in which 4 polyethyleneimine chains are bound to a benzene ring core, was obtained by using the precursor polymer, and by hydrolyzing polymethyloxazoline in the same manner as in Synthesis Example 1 above. From the measurement of $^1$H-NMR (TMS external standard, in heavy water), it was found that the peak at 1.98 ppm derived from the side chain methyl of the precursor polymer prior to hydrolysis completely disappeared.

The resulting star-shaped polymer was subjected to reprecipitation in ammonia, washing with cold water, and drying in the same manner as in Synthesis Example 1 above, to obtain a star-shaped polymer having linear polyethyleneimine chains (T-PEI), in which 4 straight polyethyleneimine chains are bound to a benzene ring core.

Example 1

Monodisperse Silica Spheres From Linear Polymer Having Linear Polyethyleneimine Chain 70 mg of the L-PEI powder obtained in Synthesis Example 1, and 1.2 mg of tetra(p-sulfonylphenyl)porphyrin (TSPP) were dissolved in 7 mL of methanol, and then 3 mL of distilled water was added to the solution to prepare aggregates of L-PEI/TSPP. Here, the molar ratio between the ethyleneimine unit in the polymer and the acidic group in TSPP was 1200/1, and the concentration of L-PEI in the mixed solvent was 0.7%. 10 mL of tetramethoxysilane (TMOS) was added to these aggregates, and the mixture was left to stand for 15 minutes at room temperature. Ethanol was added to the mixture, and washing by centrifugation was repeated three times in a centrifuge. The resulting solid matter showed a light brown color due to the presence of porphyrin residue.

A methanol dispersion of this solid matter was dropped on a glass slide, and the sample was dried (removal of solvent) by leaving the sample to stand for 6 hours at 25° C. The resultant was observed by scanning electron microscopy. The scanning electron micrograph obtained is presented in FIG. 1. The resulting monodisperse spheres were confirmed to be monodisperse spheres having a diameter of 400±30 nm.

Also, from the fluorescence spectroscopic measurement of the methanol dispersion of monodisperse spheres, an intense fluorescent peak derived from the porphyrin residue appeared at a wavelength of 650 nm. This suggests that the fluorescent substance porphyrin was incorporated into the monodisperse spheres. Here, the content of silica in the obtained spheres was 80%.

Example 2

Monodisperse Silica Spheres Using Star-Shaped Polymer Having Linear Polyethyleneimine Chains (H-PEI)

Aggregates were prepared in the same manner as in Example 1, except that the H-PEI synthesized in Synthesis Example 2 was used instead of the L-PEI powder of Example 1, and mixing of the aggregates with TMOS resulted in a solid matter. Here, the molar ratio between the ethyleneimine unit in the polymer and the acidic group in TSPP was 1200/1, and the concentration of H-PEI in the mixed solvent was 0.7%.

Figure 2:
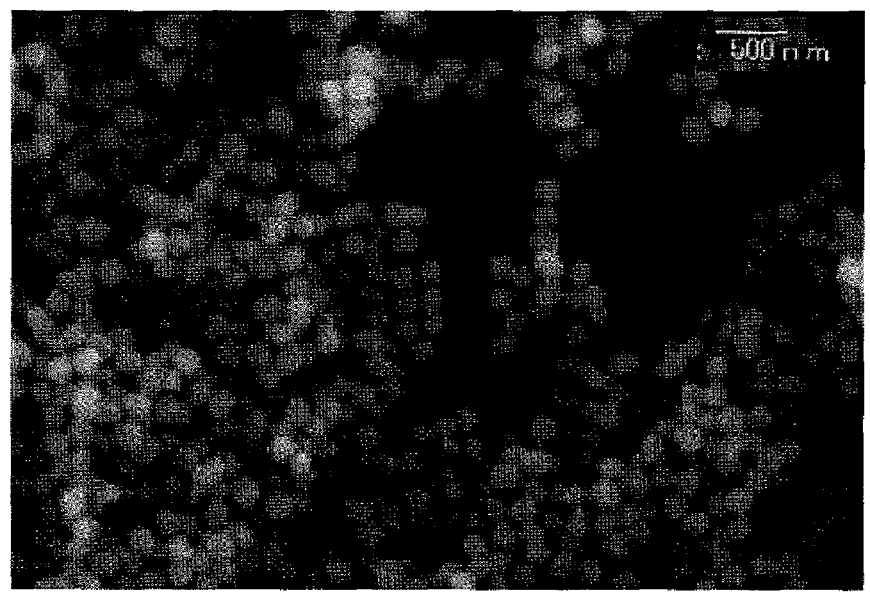
FIG. 2 is a scanning electron micrograph of the monodisperse silica spheres according to Example 2 of the present invention.

A methanol dispersion of this solid matter was dropped on a glass slide, and the state of the sample after drying was observed by scanning electron microscopy. The scanning electron micrograph obtained is presented in FIG. 2. The resulting monodisperse spheres were confirmed to be monodisperse spheres having a diameter of 150±20 nm.

Also, from the fluorescence spectroscopic measurement of the methanol dispersion of monodisperse spheres, an intense fluorescent peak derived from the porphyrin residue appeared at a wavelength of 650 nm. This suggests that the fluorescent substance porphyrin was incorporated into the monodisperse spheres. Here, the content of silica in the obtained spheres was 76%.

Example 3

Monodisperse Silica Spheres Using Star-Shaped Polymer Having Linear Polyethyleneimine Chains (H-PEI)

Aggregates were prepared in the same manner as in Example 1, except that the H-PEI synthesized in Synthesis Example 2 was used instead of the L-PEI powder of Example 1, and the molar ratio between the ethyleneimine unit in the polymer and the acidic group in TSPP within the aggregates was changed from 1200/1 to 600/1. Mixing of the aggregates with TMOS resulted in a solid matter. Here, the concentration of H-PEI in the mixed solvent was 0.7%.

Figure 3:
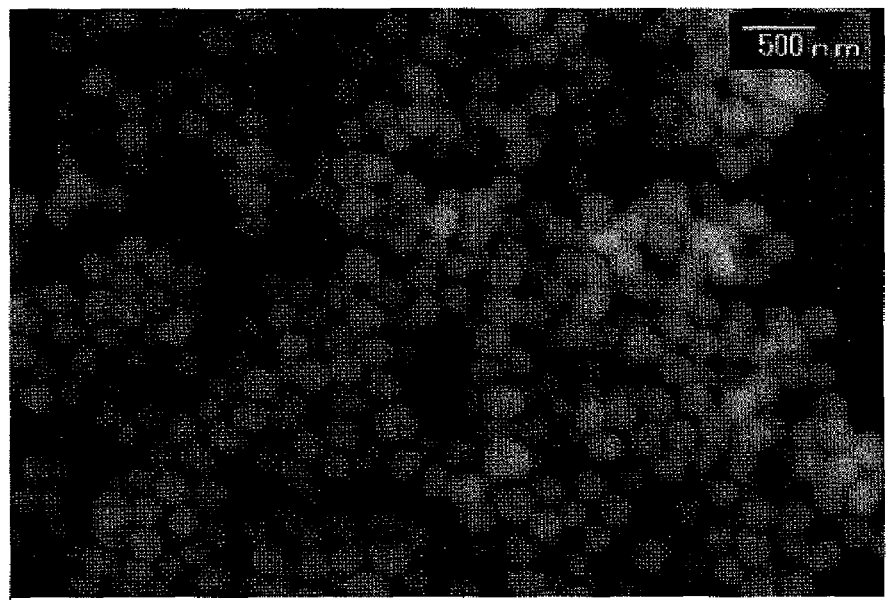
FIG. 3 is a scanning electron micrograph of the monodisperse silica spheres according to Example 3 of the present invention.
Figure 4:
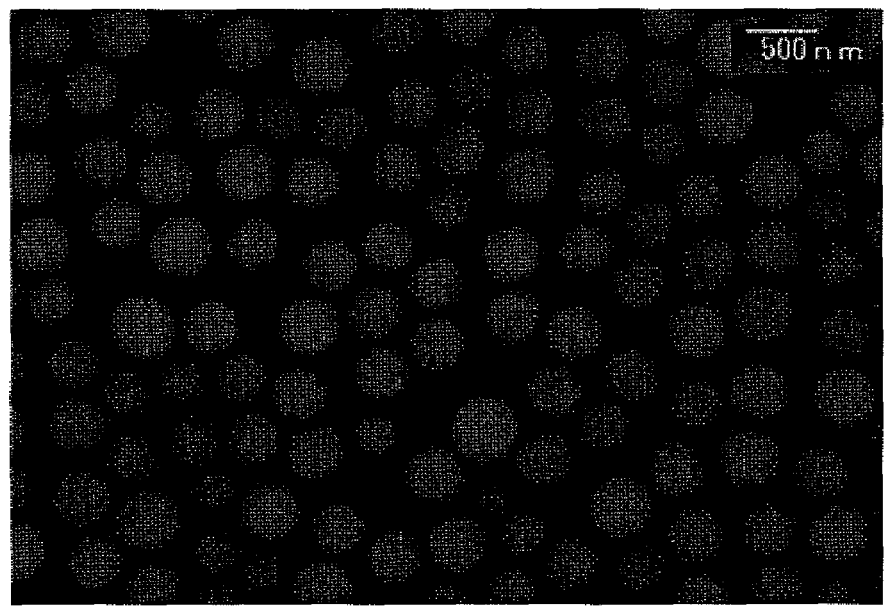
FIG. 4 is a scanning electron micrograph of the monodisperse silica spheres according to Example 4 of the present invention.

A methanol dispersion of this solid matter was dropped on a glass slide, and the state of the sample after drying was observed by scanning electron microscopy. The scanning electron micrograph obtained is presented in FIG. 3. The resulting monodisperse spheres were confirmed to be monodisperse spheres having a diameter of 200±20 nm.

Also, from the fluorescence spectroscopic measurement of the methanol dispersion of monodisperse spheres, an intense fluorescent peak derived from the porphyrin residue appeared at a wavelength of 650 nm. This suggests that the fluorescent substance porphyrin was incorporated into the monodisperse spheres. Here, the content of silica in the obtained spheres was 78%.

Example 4

Monodisperse Silica Spheres Using Star-Shaped Polymer Having Linear Polyethyleneimine Chains (T-PEI)

Aggregates were prepared in the same manner as in Example 1, except that the T-PEI synthesized in Synthesis Example 3 was used instead of the L-PEI powder of Example 1, and mixing of the aggregates with TMOS resulted in a solid matter. Here, the molar ratio between the ethyleneimine unit in the polymer and the acidic group in TSPP was 1200/1, and the concentration of H-PEI in the mixed solvent was 0.7%.

A methanol dispersion of this solid matter was dropped on a glass slide, and the state of the sample after drying was observed by scanning electron microscopy. The resulting monodisperse spheres were confirmed to be monodisperse spheres having a diameter of 450±25 nm.

Also, from the fluorescence spectroscopic measurement of the methanol dispersion of monodisperse spheres, an intense fluorescent peak derived from the porphyrin residue appeared at a wavelength of 650 nm. This suggests that the fluorescent substance porphyrin was incorporated into the monodisperse spheres. Here, the content of silica in the obtained spheres was 78%.

Application Examples 1 to 4

Stability Evaluation For Organic-Inorganic Complex Type Monodisperse Silica Spheres Methanol dispersions (concentration 3%) of the monodisperse silica spheres obtained in Examples 1 to 4 were sealed at room temperature (25° C.) and left under storage (3 months), and changes thereof were evaluated by visually observing the dispersions.

The spheres of Example 1 (Application Example 1) and Example 4 (Application *Example* 4) had larger sphere sizes, and thus showed slight settlement. However, upon re-stirring, the dispersions became homogeneous. The dispersions of Example 2 and Example 3 did not show any settlement.

Furthermore, the spheres after storage were observed by scanning electron microscopy similar to the aforementioned method. There was no change in the sphere sizes, and it was confirmed that secondary agglomeration or the like did not occur.

Comparative Example 1

Sol-Gel Reaction Using Commercially Available Polymer Having Multi-Branched Polyethyleneimine Chain Preparation of aggregates and mixing with TMOS were carried out in the same manner as in Example 1, using a multi-branched polyethyleneimine (manufactured by Sigma-Aldrich Company; number average molecular weight:

25,000) instead of the L-PEI of Example 1. TMOS was added, and after 2 minutes, the entire reaction liquid gelated to form a mass of clear gel.

Comparative Example 2

Sol-Gel Reaction Using Commercially Available Polymer Having Multi-Branched Polyethyleneimine Chain The same procedure was carried out in the same manner as in Comparative Example 1, using a multi-branched polyethyleneimine (SP-012; number average molecular weight: 1,200) manufactured by Nihon Shokubai Co., Ltd. A mass of gel was formed.

Thus, the multi-branched polyethyleneimine having primary, secondary and tertiary amines in a random manner in the molecule could not provide monodisperse spheres, unlike the linear polyethyleneimine chains comprising secondary amines.

INDUSTRIAL APPLICABILITY

According to the present invention, there can be provided monodisperse silica fine spheres to which a variety of functional groups can be introduced, and which contain an organic material, and a compound having an acidic group, while having highly excellent monodispersity, and a process for producing the monodisperse spheres conveniently within a short time.

The invention claimed is:

1. Monodisperse silica spheres containing polyamine, wherein the silica spheres comprises a polymer (A) having a linear polyethyleneimine chain, a compound (B) having an acidic group, and silica (C),
wherein the compound (B) having an acidic group is a polyfunctional acidic compound (b1), or a monofunctional acidic compound (b2) having hydrophobic chains that are capable of hydrophobic bonding therebetween.

2. The monodisperse silica spheres according to claim 1, wherein the number of a repeating unit regarding an ethyleneimine unit included in the linear polyethyleneimine chain is in the range of 10 to 10,000.

3. The monodisperse silica spheres according to claim 1, wherein the compound (B) having an acidic group is a fluorescent compound.

4. The monodisperse silica spheres according to claim 1, wherein the content of silica in the monodisperse spheres is in the range of 50 to 90% by mass.

5. The monodisperse silica spheres according to claim 1, wherein the ratio between the ethyleneimine units in the polymer having a linear polyethyleneimine chain and the acidic group in the compound (B) having an acidic group is, as a molar ratio represented by ethyleneimine unit/acidic group, in the range of 10/1 to 5000/1.

6. The monodisperse silica spheres according to claim 1, wherein the particle size of the spheres is in the range of 10 to 1,000 nm, and the particle size distribution of the spheres is included in a range of ±15% or less with respect to the average particle size.

7. A process for producing monodisperse silica spheres containing polyamine, the process comprising:
(1) dissolving a polymer (A) having a linear polyethyleneimine chain and a compound (B) having an acidic group in a mixed solvent of water and a water-soluble organic solvent, to obtain aggregates consisted of the polymer (A) having a linear polyethyleneimine chain and the compound (B) having an acidic group; and
(2) performing a sol-gel reaction of alkoxy silane on the aggregates as template, in the presence of water,
wherein the compound (B) having an acidic group is a polyfunctional acidic compound (b1), or a monofunctional acidic compound (b2) having hydrophobic chains that are capable of hydrophobic bonding therebetween.

8. The process for producing monodisperse silica spheres according to claim 7, wherein the compound (B) having an acidic group is a fluorescent compound.

9. The process for producing monodisperse silica spheres according to claim 7, wherein the volume ratio represented by water/water-soluble organic solvent in the mixed solvent is in the range of 30/70 to 60/40.

10. The process for producing monodisperse silica spheres according to claim 7, wherein the concentration of the polymer (A) having a linear polyethyleneimine chain, when dissolved in the mixed solvent, is in the range of 0.05 to 15% by mass.

11. The monodisperse silica spheres according to claim 1, wherein the polymer (A) is a linear, star-shaped or comb-shaped polymer.

12. The monodisperse silica spheres according to claim 1, wherein the compound (B) having an acidic group is at least one selected from the group consisting of carboxylic acid compounds having a functionality of 2 or greater, polysulfonic acid compounds having a functionality of 2 or greater, and polyphosphoric acid compounds having a functionality of 2 or greater.

13. The monodisperse silica spheres according to claim 1, wherein the compound (B) having an acidic group is at least one selected from the group consisting of tartaric acid, antimonyl tartaric acid, maleic acid, cyclohexanetricarboxylic acid, cyclohexanehexacarboxylic acid, adamantanedicarboxylic acid, adipic acid, azelaic acid, sebacic acid, undecanedioic acid, di(ethylene glycol) bis(carboxymethyl)ether, tri(ethylene glycol) bis(carboxymethyl) ether, terephthalic acid, biphenyldicarboxylic acid, oxybisbenzoic acid, PIPES, acid yellow, acid blue, acid red, direct blue, direct yellow, direct red, poly(acrylic acid), poly(methacrylic acid), poly(styrene sulfonic acid), acidified RNA, DNA oligomers, sulfuric acid, phosphoric acid, boric acid, disulfuric acid, diphosphoric acid, polyphosphoric acid, tetraphenylporphyrin tetracarboxylic acid, pyrenedicarboxylic acid, pyrenedisulfonic acid, pyrenetetrasulfonic acid, tetraphenylporphyrin tetrasulfonic acid, tetraphyenylporphyrin tetraphosphonic acid, and phthalocyanine tetrasulfonic acid.

14. The process for producing monodisperse silica spheres according to claim 7, wherein the polymer (A) is a linear, star-shaped or comb-shaped polymer.

15. The process for producing monodisperse silica spheres according to claim 7, wherein the compound (B) having an acidic group is at least one selected from the group consisting of carboxylic acid compounds having a functionality of 2 or greater, polysulfonic acid compounds having a functionality of 2 or greater, and polyphosphoric acid compounds having a functionality of 2 or greater.

16. The process for producing monodisperse silica spheres according to claim 7, wherein the compound (B) having an acidic group is at least one selected from the group consisting of tartaric acid, antimonyl tartaric acid, maleic acid, cyclohexanetricarboxylic acid, cyclohexanehexacarboxylic acid, adamantanedicarboxylic acid, adipic acid, azelaic acid, sebacic acid, undecanedioic acid, di(ethylene glycol) bis(carboxymethyl)ether, tri(ethylene glycol) bis(carboxymethyl) ether, terephthalic acid, biphenyldicarboxylic acid, oxybisbenzoic acid, PIPES, acid yellow, acid blue, acid red, direct blue, direct yellow, direct red, poly(acrylic acid), poly(methacrylic acid), poly(styrene sulfonic acid), acidified RNA, DNA oligomers, sulfuric acid, phosphoric acid, boric acid, disulfuric acid, diphosphoric acid, polyphosphoric acid, tetraphenylporphyrin tetracarboxylic acid, pyrenedicarboxylic acid, pyrenedisulfonic acid, pyrenetetrasulfonic acid, tetraphenylporphyrin tetrasulfonic acid, tetraphyenylporphyrin tetraphosphonic acid, and phthalocyanine tetrasulfonic acid.

17. The process for producing monodisperse silica spheres according to claim 7, which further comprises a sub-step of: adding alkoxy silane or a solution including alkoxy silane to the mixed solvent in which the aggregate are included.

18. The monodisperse silica spheres according to claim 1, wherein the amine in the main chain of the linear polyethyleneimine is a secondary amine.

19. The monodisperse silica spheres according to claim 7, wherein the linear polyethyleneimine is soluble in hot water and crystallizes at room temperature.

20. The monodisperse silica spheres according to claim 7, wherein the amine in the main chain of the linear polyethyleneimine is a secondary amine.

21. The monodisperse silica spheres according to claim 7, wherein the linear polyethyleneimine is soluble in hot water and crystallizes at room temperature.

* * * * *